UNITED STATES PATENT OFFICE.

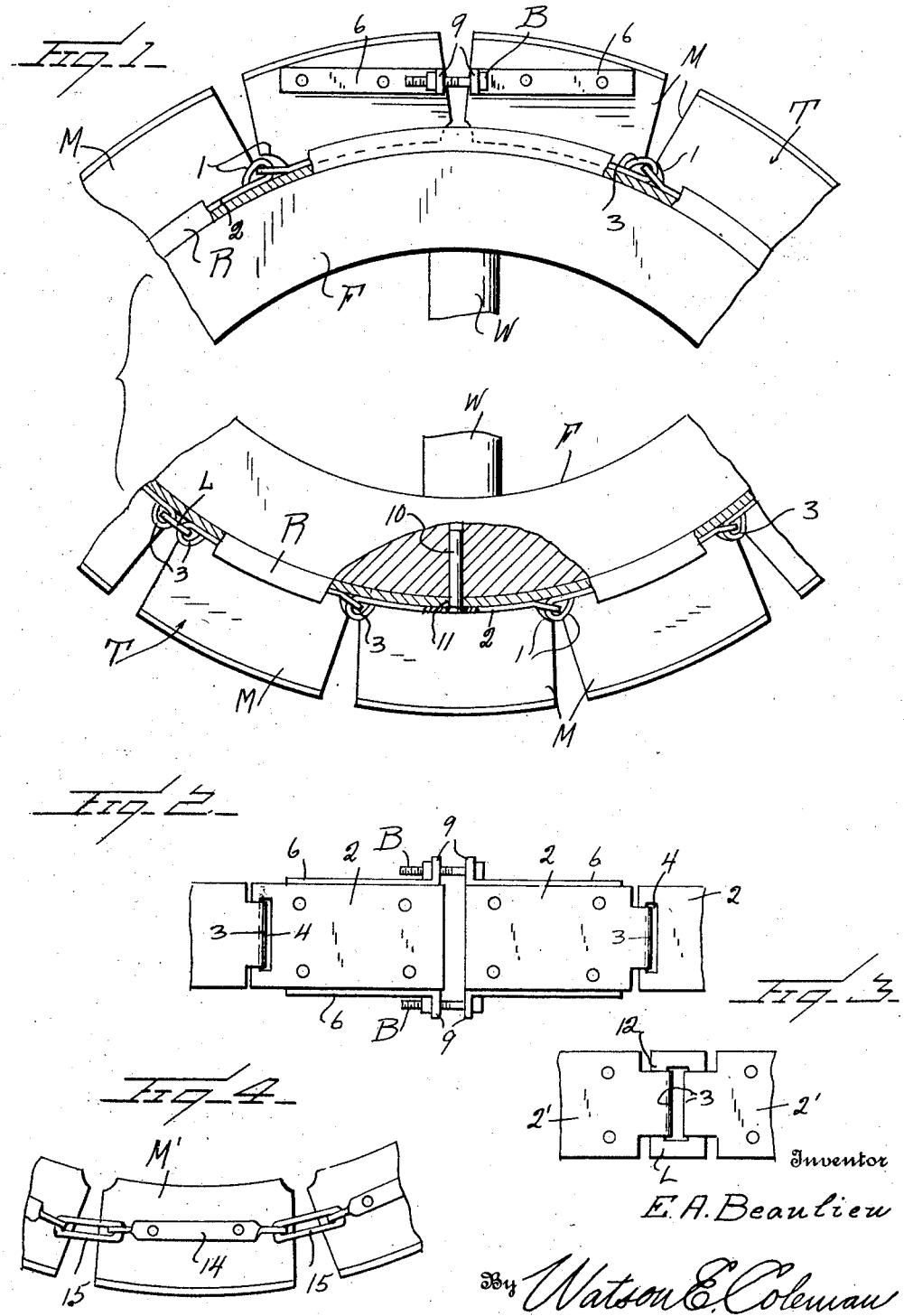

EUGENE A. BEAULIEU, OF GRACEVILLE, MINNESOTA.

FOLDING EMERGENCY-TIRE.

1,338,807.                    Specification of Letters Patent.        Patented May 4, 1920.

Application filed June 18, 1919. Serial No. 305,068.

*To all whom it may concern:*

Be it known that I, EUGENE A. BEAULIEU, a citizen of the United States, residing at Graceville, in the county of Bigstone and State of Minnesota, have invented certain new and useful Improvements in Folding Emergency-Tires, of which the following is a specification, reference being had to the accompanying drawings.

This invention relates to certain improvements in tire structures, and it is an object of the invention to provide a novel and improved structure of this general character which is particularly adapted for use in an emergency, although the same can be employed to advantage for general use.

It is also an object of the invention to provide a novel and improved structure of this general character which may be readily folded when not in use, so that the same will occupy a minimum of space to facilitate the storage thereof under the seat or other convenient location in the body of a vehicle.

Another object of the invention is to provide a novel and improved structure of this general character which eliminates the necessity of carrying an extra inflatable tire and also whereby the necessity of pumping up tires on the road may be avoided.

An additional object of the invention is to provide a novel and improved structure of this construction, comprising a series of hingedly connected members adapted to be disposed circumferentially around a wheel body, together with means whereby said hingedly connected members may be maintained in applied position.

Another object of the invention is to provide a device of this general character comprising hingedly connected members adapted to be disposed circumferentially around a wheel body and wherein one of said members is provided with means coacting with the wheel body for holding the tire structure against circumferential movement independently of the wheel body.

The invention consists in the details of construction and in the combination and arrangement of the several parts of my improved tire structure, whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:—

Figure 1 is a fragmentary view in side elevation with portions broken away of a tire structure arranged in accordance with an embodiment of my invention and in applied position.

Fig. 2 is a fragmentary view in bottom plan of my improved structure as herein disclosed.

Fig. 3 is a fragmentary view in bottom plan illustrating a hinged connection between certain of the members or blocks whereby the tire structure may be folded back upon itself, and Fig. 4 is a fragmentary view in side elevation illustrating a slightly modified form of the invention.

As disclosed in the accompanying drawings, W denotes a wheel body of any desired type and which includes the rim R. My improved tire structure T is adapted to be applied to the rim R in the case of an emergency and particularly in the event when the inflatable tire originally mounted thereon becomes unfit for use so that the necessity of traveling on the rim or upon a deflated tire is avoided.

My improved tire structure T comprises a plurality of members or blocks M formed of any desired material. The inner corners of each of the members or blocks M are cut away as at 1 so that the hinged connection between adjacent members or blocks will permit said blocks to be arranged in close proximity one to the other.

As is particularly illustrated in Fig. 2, each of the members or blocks M has secured to the inner face thereof, a metallic plate 2 extending beyond the opposite ends of the member or block M and one end portion of the plate is returned to afford a knuckle 3 while the opposite end portion of the plate is provided with a transverse slot 4 through which is adapted to be inserted the knuckle 3 of an adjacent member or block M. By this arrangement it will be at once perceived that the members or blocks M are hingedly connected in a manner whereby the device, when not in use, may be readily folded or compacted to occupy a mimimum amount of space so that the device may be readily stored beneath the seat of a motor driven or other type of vehicle or at some other out of the way place.

It is also to be noted that the end portion of each of the plates 2 provided with the slot 4 is inclined in a direction inwardly of the block or member M to which the plate is attached or in a direction away from the rim R when the tire structure is applied. Furthermore, it is to be noted that the knuckle 3 at the opposite end of the plate extends inwardly of the adjacent block or member M or in a direction away from the rim R. By this means, it is assured that the plates 2 of adjacent blocks or members M will have contact substantially throughout their entire length with the rim R as the hinged connection between adjacent blocks or members M offers no obstruction to the seating of said blocks or members upon the rim R.

Each of the end members or blocks M has secured to the opposite side faces thereof the elongated plates 6 disposed longitudinally on an inward angle with respect to the longitudinal axis of the member or block M and the outer or forward extremities of the plate 6 terminate in the laterally directed perforate ears or lugs 9.

When my improved tire T is disposed circumferentially around a rim R of the wheel structure W, the clamping bolts B or the like are disposed through opposed ears or lugs 9 whereby the structure T may be effectively maintained in applied position. The maintenance of the tire structure T in applied position is materially facilitated by the particular arrangement of the plates 6.

One of the intermediate members or blocks M and preferably the central member has extending inwardly of its inner face a pin or finger 10 which is adapted to be received within an opening 11 formed in the rim R and continued through the felly F of the wheel structure W. By this arrangement the tire structure T when in applied position is positively held against circumferential movement independently of the wheel structure W.

As illustrated in Fig. 3, I disclose a form of hinged connection between adjacent blocks or members M whereby the structure when not in use may be folded straight back. As disclosed in this figure, the adjacent ends of the plates 2' are provided with the knuckles 3' and which knuckles have freely directed therethrough the bars 12 of a rigid connecting link L. In practice it is desired that a connection similar to this be employed at intervals along my improved structure so that the desired folding thereof when not in use may be facilitated.

It is to be particularly noted that adjacent ends of blocks M are spaced apart with their opposed faces extending outwardly, when the structure T is applied, in divergence. In practice this is of manifest advantage as the spaces between the blocks or members M permit said blocks or members to operate effectually as anti-slipping devices whereby the wheel to which the structure T is applied is caused to positively grip the surface over which it is traveling and particularly when running on muddy roads or over sand or snow.

As illustrated in Fig. 4, I disclose a modified form of my invention and wherein members or blocks M' have secured to their side faces the plates 14 connected by the links 15.

From the foregoing description, it is thought to be obvious that a tire structure constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

As a new article of manufacture, an emergency tire structure comprising a plurality of blocks, plates secured to the inner faces of the blocks and extending beyond the opposite ends thereof, the inner corners of each of the blocks being cut away, one end portion of each of the plates being inclined inwardly with respect to the adjacent block and provided with a slot, the opposite end portion of said plate being provided with a knuckle disposed inwardly of the block, the knuckle of one plate being loosely disposed through the slot in the inclined end portion of the plate of an adjacent block, the inclined ends of the plates and the knuckles seating in the cut-away portions of the blocks, the arrangement of the inclined ends and knuckles of the plates offering no obstruction to the seating of the tire in applied position.

In testimony whereof I hereunto affix my signature in the presence of two witnesses.

EUGENE A. BEAULIEU.

Witnesses:
 MARTIN F. HIGGINS,
 MAUD O'HEREN.